Dec. 6, 1955 C. D. PETERSON 2,726,101
INSULATING SCREW-THIMBLE PIPE FITTING
Filed April 6, 1950
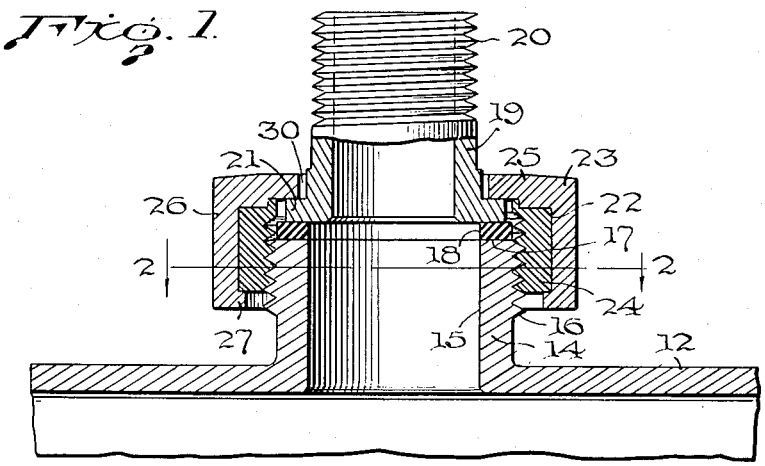
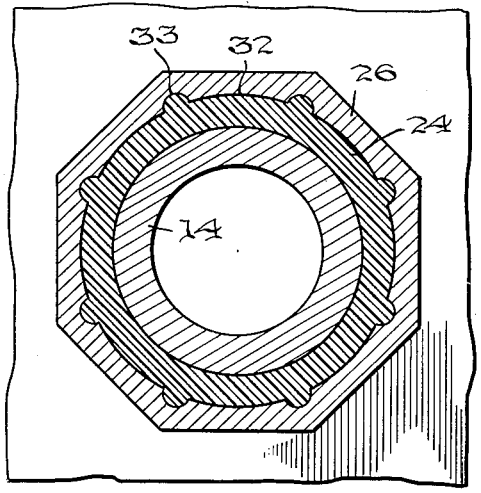 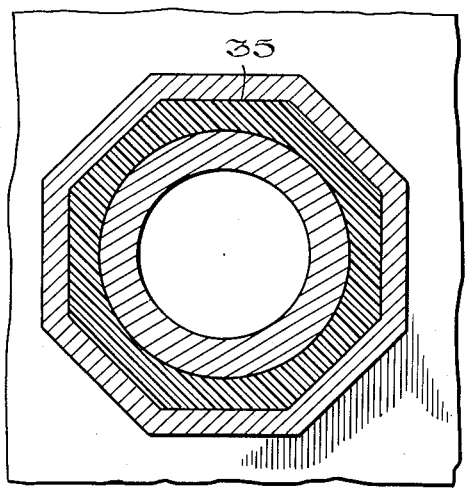
INVENTOR.
CHARLES D. PETERSON
BY
Leech & Radue
ATTORNEYS

United States Patent Office 2,726,101
Patented Dec. 6, 1955

2,726,101

INSULATING SCREW-THIMBLE PIPE FITTING

Charles D. Peterson, Dallas, Tex., assignor to Universal Controls Corporation, Dallas, Tex., a corporation of Texas Application April 6, 1950, Serial No. 154,256

2 Claims. (Cl. 285—16)

This invention relates to insulating pipe connections and particularly to such connections of the union or swivel union type.

It is a general object of the present invention to provide a novel and improved insulating pipe fitting of the union type.

More particularly it is an object of the invention to provide, in a pipe fitting, confronting tube ends separated by an insulating washer resistant to the material flowing therein, together with a union nut rotatably mounted over a flange on one tube and containing a rigid, fixed, insulating lining, threaded on its inner surface to engage threads on the other tube.

One of the more important features of the invention resides in the direct molding of the threaded insulation insert into the nut shell.

Another important feature resides in the non-circular arrangement of the interior of the side walls of the nut shell for cooperation with the molded insulating insert to prevent relative rotation between the two.

Other and further features and objects of the invention will be more apparent to those skilled in the art upon a consideration of the accompanying drawings and following specification wherein are disclosed two exemplary embodiments, with the understanding that such changes and modifications may be made therein as fall within the scope of the appended claims without departing from the spirit of the invention.

In said drawings:

Fig. 1 is a central longitudinal section through an insulating pipe coupling constructed in accordance with the present invention, the larger of the tubes of the coupling being shown integral with the housing of a gas meter;

Fig. 2 is a transverse section taken on line 2—2 of Fig. 1 and illustrating one means for preventing relative rotation between the nut shell and the insulating insert; and Fig. 3 is a view similar to Fig. 2 showing a modification of the rotation preventing means.

Many efforts have been made to provide insulating couplings for pipe lines in order to prevent the flow of electric currents through these lines. Some of these have been fairly effective for special purposes, but no wholly satisfactory device corresponding to the usual standard pipe fitting has been developed. The present invention contemplates the provision of such fittings which overcome all previous difficulties. For convenience a gas meter swivel or nipple of the union type has been illustrated and will be described, but it will be clear that this constitutes no limitation in form, the novel features being applicable to most any standard type fitting. The fitting shown is capable of being substituted for any standard all metal nipple without any change in the position of the meter or surface pipes and without requiring the cutting or fitting of any parts. The device of the present invention compares in all physical dimensions with the all metal fitting which it replaces.

The companies providing gas distribution for domestic and industrial use take great care to prevent corrosion and in addition to coating and/or wrapping all underground pipes they use various forms of protection against electrolysis, such as self-sacrificing anodes or maintaining the conduit system in an electronegative state by various means. In order that these efforts be effective it is essential that the gas pipe and conduit system be entirely electrically insulated from other pipe and conduit systems, etc. which may be made of dissimilar metals or have different potentials thereon. In houses and other buildings telephone and other direct current lines are often grounded to water or gas pipe. Water and gas pipes are often in contact, as fortuitously in narrow pipe channels or at crossings and purposely in machines using both gas and water as water heaters, gas furnaces, etc. The only safe method of maintaining the gas conduit system at the desired cathodic potential is to completely insulate it electrically from all building piping by the use of an insulating fitting between the service pipe and the meter.

Referring now to the drawing, it may be pointed out that the pipe coupling is here shown with one part integral with the cast housing 12 of a so-called cast iron gas meter, but obviously such part can be integral with any other type of housing or formed with a threaded lower end for insertion into a conventional pipe fitting. Preferably this end would be reduced, for the purpose, to the same diameter as the swivel end.

The swivel union of the present invention includes the larger diameter tube 14, which is the one shown attached to the meter housing, having a straight central bore 15 and external threads 16 adjacent its outer end. Preferably this end is cut off squarely, as shown at 17, providing a flat annular area which engages gasket 18 of suitable electrical insulating material sufficiently resilient to insure fluid tightness and of such composition as to resist any deleterious effects of the fluid flowing through the coupling. This is the only non-metallic part of the coupling subjected to the gas or other fluid secured thereby.

The swivel tube 19 is of less internal diameter than tube 14 and is externally threaded at 20 with a standard pipe thread to be received in an Ell, T, coupling or the like. At the opposite end swivel tube 19 is radially outwardly flanged at 21 to provide a substantially flat annular area for confronting end 17 of tube 14 to compress the gasket 18 between them in a fluid tight joint. The top annular surface of the flange 21 is substantially flat.

The two tubes are adapted to be drawn together to compress the gasket and provide a good mechanical connection between them by means of nut 22 composed of a metal shell 23 and an insulating insert 24. The shell is preferably made from a casting, and if this is non-ferrous it is galvanized after any required machining. The shell comprises a substantially flat top wall 25, an annular wall 26 which is hexagonal or octagonal on its outer surface, as seen in Figs. 2 and 3, to facilitate the application of a wrench thereto, and the lower inturned flange or lip 27, the bore of which is of considerably greater diameter than that across the crests of the threads 16 to insure adequate clearance.

The top wall 25 is centrally bored at 30 to fit loosely over swivel tube 19 and the inner portion of the wall adjacent this tube overhangs and bears on the flat annular surface at the top of the swivel tube flange 21. Machining of both of these parts is indicated here.

The nut shell receives an annular filling of plastic insulating material 24 preferably by a molding operation. Such material when hardened should be relatively inelastic, of high structural strength and rigidity, of good electrical insulating properties and of a stable nature. It is prevented from separating from the shell should it shrink by the lip 27. It does not have to be resistant to the material flowing through the union which is excluded from contact therewith by gasket 18.

The insulating insert 24 has its inner surface threaded coaxially with bore 30 for cooperation with threads 16 on tube 14. Such threads are preferably formed during the molding operation by a suitable threaded plug, as will be appreciated. For use with gas meters three different sets of threads are necessary. In order to prevent relative rotation between the molded insert and the shell of the nut, the interior of the shell is formed to a non-circular configuration. As seen in Fig. 2 the side walls 32 of the nut shell are in general circular on the interior, but where the maximum thickness of metal occurs in such walls semi-cylindrical channels 33 are provided which the insulating material fills to prevent relative rotation. In Fig. 3 the interior side walls of the nut shell are parallel to the exterior walls and are hence polygonal, as shown at 35 and serve the same purpose.

The union of the present invention includes only one principal novel part, i. e., the nut with its insulating threaded insert, but some change is made in the conventional swivel tube which in most swivel unions includes a sput or extension from the lower face thereof to pass through and centralize the gasket 18. This is wholly eliminated in accordance with the present invention to insure against any possibility of metallic contact between the two tubes of the coupling. No difficulty is experienced in centralizing the gasket however since its external diameter is just slightly less than that across the tops of the threads in the insulating insert which serve therefore as a centralizing means when the nut is being turned down.

All of the above described parts are interchangeable with those of standard couplings at present used in the plumbing and gas fitting industry so that no piping or other changes are required when insulating existing gas meter installations. It is merely necessary to remove the old union nut, cut off the sput on the swivel tube and replace with an insulating nut and gasket in accordance with the present invention.

The construction just described has obvious advantages in simplicity, low cost and ease of use. Even should the plastic become cracked or broken it cannot fall out and since it is not relied on for gas tightness there will be no failure or leakage.

I claim:

1. In a coupling of the type described, in combination, an externally threaded tube having a substantially flat annular end; a swivel tube of lesser diameter having an annular external flange for cooperation with said first end; a fluid tight, electrically-insulating gasket between the confronting tube ends; a hollow metal nut shell rotatable on said swivel tube and having a flat top bored to fit over the swivel tube and engage said flange, side walls non-circular inside and out and an inturned bottom flange; and rigid unitary electrical insulating material moulded to seamless nut form and to fit tightly against said side walls, said top and said bottom flange, said insulation being internally threaded for engagement with the said tube threads, the thread bore diameter being intermediate that of the flat top and the inturned bottom flange.

2. An integrated, composite, insulating coupling nut for a swivel type union comprising in combination; a rigid, one piece, metal shell having a substantially flat top centrally bored for a close fit over the stem of a flanged swivel tube, depending side walls having polygonal external configuration to receive a wrench and non-circular internal configuration, and a narrow inturned bottom flange; a rigid, hard insert of relatively inelastic insulating material shaped in a continuous closed annulus closely fitting said inner side walls, all of the inner face of said bottom flange and that portion of the inner face of said top lying outside of a circle having a slightly greater diameter than the flange of a swivel tube; said insert being continuously threaded coaxially to said central bore of the shell top to a diameter greater than the external diameter of a swivel tube flange and less than the internal diameter of the inturned bottom flange of said shell.

References Cited in the file of this patent

UNITED STATES PATENTS

| 248,975 | Wootten | Nov. 1, 1881 |
| 262,193 | Wootten | Aug. 1, 1882 |
| 514,304 | Clift | Feb. 6, 1894 |
| 522,896 | Henley | July 10, 1894 |
| 883,080 | Bullock | Mar. 24, 1945 |
| 923,164 | Glauber | June 1, 1909 |
| 1,433,518 | Kraft | Oct. 24, 1922 |
| 2,131,319 | Grenholtz et al. | Sept. 27, 1938 |
| 2,391,421 | Ineson | Dec. 25, 1945 |
| 2,450,694 | Sauer | Oct. 5, 1948 |
| 2,569,333 | Peterson | Sept. 25, 1951 |

FOREIGN PATENTS

| 242,686 | Switzerland | Oct. 16, 1946 |